(12) United States Patent
Sporea et al.

(10) Patent No.: US 12,140,484 B2
(45) Date of Patent: Nov. 12, 2024

(54) APPARATUS FOR PRODUCING AN ELECTRICAL SIGNAL THAT IS INDICATIVE OF A TEMPERATURE

(71) Applicant: University of Surrey, Guildford (GB)

(72) Inventors: Radu Alexandru Sporea, Guildford (GB); Eva Bestelink, Guildford (GB)

(73) Assignee: University of Surrey, Guildford (GB)

( * ) Notice: Subject to any disclaimer, the term of this patent is extended or adjusted under 35 U.S.C. 154(b) by 361 days.

(21) Appl. No.: 17/639,239

(22) PCT Filed: Aug. 27, 2020

(86) PCT No.: PCT/GB2020/052056
§ 371 (c)(1),
(2) Date: Feb. 28, 2022

(87) PCT Pub. No.: WO2021/038230
PCT Pub. Date: Mar. 4, 2021

(65) Prior Publication Data
US 2022/0326091 A1    Oct. 13, 2022

(30) Foreign Application Priority Data

Aug. 30, 2019  (GB) ...................................... 1912526

(51) Int. Cl.
*G05F 3/24*      (2006.01)
*G01K 7/01*     (2006.01)
*G05F 3/26*      (2006.01)

(52) U.S. Cl.
CPC ............... *G01K 7/01* (2013.01); *G05F 3/245* (2013.01); *G05F 3/26* (2013.01)

(58) Field of Classification Search
None
See application file for complete search history.

(56) References Cited

U.S. PATENT DOCUMENTS 5,686,858 A     11/1997  Malherbe
5,912,595 A  *   6/1999  Ma ......................... H03L 1/025
                                                                  331/177 V (Continued)

OTHER PUBLICATIONS

European Patent Office, International Search Report and Written Opinion, Oct. 29, 2020.

(Continued)

*Primary Examiner* — Thomas J. Hiltunen
(74) *Attorney, Agent, or Firm* — Ryan Dean; Umberg Zipser LLP

(57) ABSTRACT

Apparatus for producing an electrical signal that is indicative of a temperature is disclosed, the apparatus comprising: a first thin-film transistor TFT comprising a first source, a first gate and a first drain, the first drain being configured to receive a reference current; and a second TFT comprising a second source, a second gate and a second drain, the first and second gates both being configured to receive the same gate voltage, wherein the first and second TFTs are configured such that a temperature dependence of the first TFT differs from a temperature dependence of the second TFT, such that an output current at the second TFT and the second drain is dependent on temperature. The temperature dependence of the output current can be controlled by selecting suitable design parameters for the first and second TFTs. A method of designing the apparatus to produce an output current with a target temperature dependence is also disclosed.

20 Claims, 11 Drawing Sheets

(56) References Cited

U.S. PATENT DOCUMENTS

| | | | |
|---|---|---|---|
| 9,035,692 B2 * | 5/2015 | Dey | H03F 1/301 |
| | | | 327/513 |
| 9,298,205 B2 * | 3/2016 | Bianchi | G01K 7/01 |
| 10,721,977 B2 * | 7/2020 | Gueritee | H05B 1/0272 |
| 11,940,825 B2 * | 3/2024 | Quelen | H01L 29/7838 |
| 2001/0028278 A1 | 10/2001 | Ooishi | |
| 2010/0163545 A1 * | 7/2010 | Wang | G05D 23/27 |
| | | | 219/494 |
| 2015/0116042 A1 * | 4/2015 | Kim | H03K 3/011 |
| | | | 331/57 |
| 2016/0315196 A1 * | 10/2016 | Barlage | H01L 21/0262 |
| 2019/0025135 A1 * | 1/2019 | Zhang | G01K 7/32 |

OTHER PUBLICATIONS

Sporea et al., Temperature Dependence of the Current in Schottky-Barrier Source-Gated Transistors, Journal of Applied Physics, American Institute of Physics, US, vol. 117, No. 18, May 14, 2015, XP012197433.

* cited by examiner

APPARATUS FOR PRODUCING AN ELECTRICAL SIGNAL THAT IS INDICATIVE OF A TEMPERATURE

TECHNICAL FIELD

The present invention relates to an apparatus for producing an electrical signal that is indicative of a temperature.

BACKGROUND

Electrical circuits and devices are known which can detect changes in temperature. For example, the threshold voltage of a metal oxide semiconductor field effect transistor (MOSFET) can be used to detect a change in temperature, or a thermistor can be used to produce an output current that increases with temperature. In both cases the resulting signal could be used for temperature regulation, for example in an overheat protection circuit, however additional circuitry would be required to reduce an output current in response to an increase in the detected current. Also, there may be limited design freedom in such circuits to alter the temperature dependence of the output signal. There is therefore a need in the art for a circuit design that can be adapted to produce output signals with varying temperature dependences.

SUMMARY OF THE INVENTION

According to a first aspect of the present invention, there is provided apparatus comprising: a first thin-film transistor TFT comprising a first source, a first gate and a first drain, the first drain being configured to receive a reference current; and a second TFT comprising a second source, a second gate and a second drain, the first and second gates both being configured to receive the same gate voltage, wherein the first and second TFTs are configured such that a temperature dependence of the first TFT differs from a temperature dependence of the second TFT, such that an output current at the second TFT and the second drain is dependent on temperature.

In some embodiments according to the first aspect, in isolation the first and second TFTs both have a positive temperature dependence, and the first TFT is more strongly temperature-dependent than the second TFT with the result that the overall temperature dependence of the output current is negative, such that a magnitude of the output current decreases as a temperature of the first and second TFTs increases.

In some embodiments according to the first aspect, in isolation the first and second TFTs both have a negative temperature dependence, and the second TFT is more strongly temperature-dependent than the first TFT with the result that the overall temperature dependence of the output current is negative, such that a magnitude of the output current decreases as a temperature of the first and second TFTs increases.

In some embodiments according to the first aspect, the first and second TFTs are source-gated transistors.

In some embodiments according to the first aspect, an area of overlap between the first source and the first gate, $S_1$, is different to an area of overlap between the second source and the second gate, $S_2$, such that the temperature dependence of the first TFT differs from the temperature dependence of the second TFT.

In some embodiments according to the first aspect, for each of the first and second TFTs a threshold source length exists beyond which increasing the source length has a negligible effect on the temperature dependence of the current flowing through the TFT, wherein one of $S_1$ and $S_2$ is at or above the threshold source length, and the other one of $S_1$ and $S_2$ is below the threshold source length.

In some embodiments according to the first aspect, the first TFT and the second TFT have different compositions such that the temperature dependence of the first TFT differs from the temperature dependence of the second TFT.

In some embodiments according to the first aspect, the first gate and the second gate comprise respective parts of a single gate, such that the single gate acts as a common gate for the first and second TFTs.

In some embodiments according to the first aspect, the apparatus is configured to operate in a temperature range between an upper temperature threshold and a lower temperature threshold, and wherein the upper and lower temperature thresholds are temperatures within a linear portion of respective temperature-current curves of the first and second TFTs. It will be appreciated that 'linear' in this context should be interpreted as meaning approximately, or substantially, linear, since in reality the relationship between temperature and current may not be exactly linear.

In some embodiments according to the first aspect, the apparatus comprises a constant current source configured to supply a constant current to the first drain as the reference current.

In some embodiments according to the first aspect, the apparatus comprises a load connected to the second TFT such that a current flowing through the load is dependent on the output current at the second drain.

In some embodiments according to the first aspect, the apparatus is configured to operate as a temperature sensor in which a magnitude of the output current at the second drain is indicative of a temperature of the first and second TFTs.

In some embodiments according to the first aspect, the apparatus comprises a current measuring unit configured to measure the magnitude of the output current, and a temperature determining unit configured to determine a temperature of the first and second TFTs in dependence on the current measured by the current measuring unit. The temperature determining unit may be configured to output the determined temperature, for example as an audible or visible indication of the determined temperature.

In some embodiments according to the first aspect, the apparatus comprises a temperature controller configured to raise or lower a temperature of the first and second TFTs, wherein the second TFT is configured to supply the output current to the temperature controller such that a magnitude of a heating or cooling effect produced by the temperature controller is dependent on a magnitude of the output current, wherein the first and second TFTs and the temperature controller form a feedback loop such that the apparatus acts as a temperature regulating circuit configured to maintain an environment in which the first and second TFTs are located at a substantially constant temperature.

In some embodiments according to the first aspect, the temperature controller comprises an oscillator circuit configured such that an oscillating frequency of the oscillator circuit is dependent on the magnitude of the output current provided by the second TFT.

In some embodiments according to the first aspect, a Joule heating effect on the first and second TFTs due to current flowing through the oscillator circuit is dependent upon the magnitude of the output current provided by the second TFT.

In some embodiments according to the first aspect, the apparatus comprises a temperature control circuit configured to receive an output of the oscillator circuit as a timing signal and produce a heating or cooling effect in dependence on the oscillating frequency of the timing signal, such that the heating or cooling effect produced by the temperature control circuit is dependent on a temperature of the first and second TFTs.

In some embodiments according to the first aspect, the oscillator circuit is a current-starved ring oscillator circuit and the second TFT is one of a plurality of second TFTs included in the current-starved ring oscillator circuit, each one of the plurality of second TFTs comprising a respective second gate configured to receive the same gate voltage as the first gate.

According to a second aspect of the present invention, there is provided a wearable electronic device comprising the apparatus according to the first aspect, wherein the apparatus is configured to regulate a temperature of at least part of the wearable electronic device.

According to a third aspect of the present invention, there is provided a method of designing the apparatus according to the first aspect, the method comprising: determining a target temperature dependence of the output current at the second TFT; determining a temperature dependence of the first TFT and a temperature dependence of the second TFT required to provide an output current with the target temperature dependence; and determining a property of the first TFT required to provide the determined temperature dependence of the first TFT, and determining a property of the second TFT required to provide the determined temperature dependence of the second TFT.

In some embodiments according to the third aspect, the method may further comprise a step of fabricating the designed apparatus.

BRIEF DESCRIPTION OF THE DRAWINGS

Embodiments of the present invention will now be described, by way of example only, with reference to the accompanying drawings, in which.

DETAILED DESCRIPTION

Figure 1:
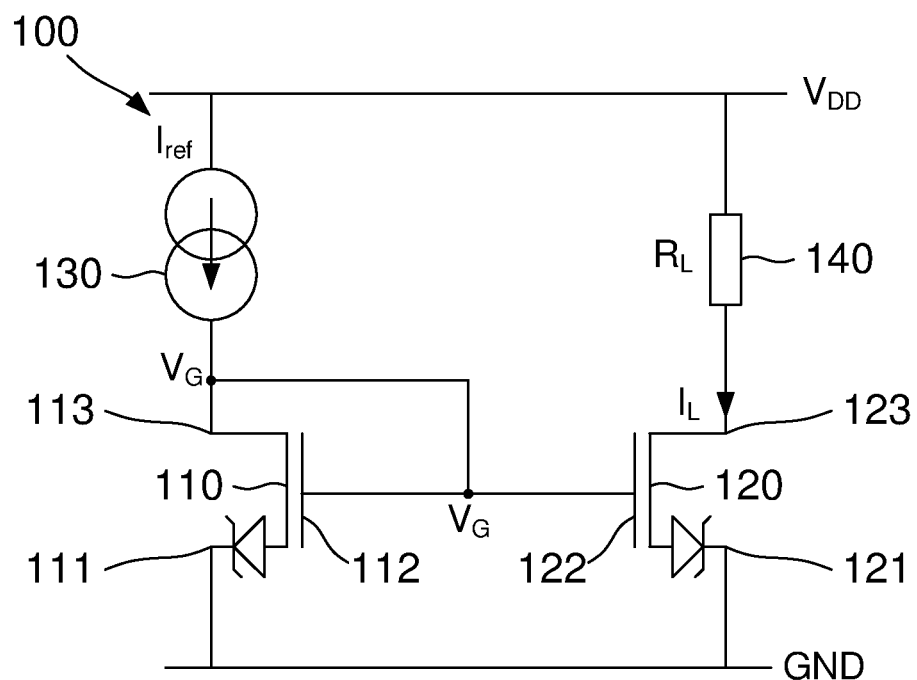
FIG. 1 illustrates an apparatus for producing an electrical signal that has either a positive or negative temperature dependence, according to an embodiment of the present invention.

In the following detailed description, only certain exemplary embodiments of the present invention have been shown and described, simply by way of illustration. As those skilled in the art would realise, the described embodiments may be modified in various different ways, all without departing from the scope of the present invention. Accordingly, the drawings and description are to be regarded as illustrative in nature and not restrictive. Like reference numerals designate like elements throughout the specification.

Referring now to FIG. 1, an apparatus for producing an electrical signal that is indicative of a temperature is illustrated, according to an embodiment of the present invention. The apparatus 100 comprises a first transistor 110 and a second transistor 120 connected in a similar manner to a current mirror circuit. The first and second transistors 110, 120 each comprise a source 111, 121, a gate 112, 122, and a drain 113, 123. The first and second transistors 110, 120 are arranged such that a potential difference between the source 111 and the gate 112 of the first transistor 110 is the same as the potential difference between the source 121 and the gate 122 of the second transistor 120. In the present embodiment this is achieved by connecting the sources 111, 121 of both transistors 110, 120 to a common reference voltage, in this case ground, and supplying the same gate voltage $V_G$ to the gates 112, 122 of both transistors 110, 120.

Circuits such as the one shown in FIG. 1 are herein referred to as "CM-type" circuits. The term "CM-type" should be understood as meaning that the circuit comprises two transistors connected in a similar manner to a current mirror, without implying that the circuit behaves in exactly the same way as a current mirror. As explained below, embodiments of the present invention exploit differences between the first and second transistors 110, 120 to produce an output current which is dependent on temperature, as opposed to a conventional current mirror in which a fixed proportion of the reference current is copied to the output at all temperatures.

Also, in the present embodiment the apparatus 100 comprises a constant current source 130 configured to supply a constant reference current $I_{ref}$. An output of the constant current source 130 is connected to the drain 113 of the first transistor 110, and is also connected to the gate 112 of the first transistor 110 and to the gate 122 of the second transistor 120. In other words, the gate 112 of the first transistor 110 and the gate 122 of the second transistor 120 are both connected to the drain 113 of the first transistor 110. In this way, the gate 112 of the first transistor 110 and the gate 122 of the second transistor 120 are each supplied with the same gate voltage $V_G$, which in the present embodiment is the voltage at the output of the constant current source 130. In other embodiments, instead of a constant current source 130 a source of variable current may be used. In such embodiments the gate 112 of the first transistor 110 and the gate 122 of the second transistor 120 may still be supplied with the same gate voltage $V_G$, for example by connecting both gates 112, 122 to a common node as in the embodiment shown in FIG. 1.

In another embodiment, the sources 111, 121 of the first and second transistors 110, 120 may not be directly connected to each other as shown in FIG. 1, but instead may be connected to separate inputs that are configured to supply the same voltage to both sources 111, 121. Similarly, in another embodiment, the gates 112, 122 of the first and second transistors 110, 120 may not be directly connected to each other as shown in FIG. 1, but instead may be connected to separate inputs that are configured to supply the same voltage to both gates 112, 122.

In a conventional current mirror, the first and second transistors both have the same temperature-dependent current and voltage characteristics. Since the function of a current mirror is to replicate the reference current, or a fixed proportion of the reference current, at the output of the second transistor, using identical transistors ensures that the reference current is accurately copied. However, the inventors have recognised that by using transistors 110, 120 which exhibit different temperature dependencies, the resulting output current at the drain 122 of the second transistor 120 varies according to temperature, and hence is indicative of the temperature of the first and second transistors 110, 120. Accordingly, in embodiments of the present invention the first and second transistors 110, 120 are configured such that a temperature dependence of the first transistor 110 differs from a temperature dependence of the second transistor 120. As a result, the output current $I_L$ flowing through a load $R_L$ 140 connected to the drain 123 of the second transistor 120 is dependent on temperature, unlike in a conventional current mirror circuit. Furthermore, the temperature dependence of the output current $I_L$ can be controlled by appropriately selecting the relative temperature dependencies of the first and second transistors 110, 120.

As described above, the apparatus 100 can be used to produce an electrical signal that is indicative of a temperature. In the present embodiment, the signal that is indicative of a temperature comprises an electrical current $I_L$ which has a magnitude that is dependent on the temperature of the first and second transistors 110, 120. Such apparatus 100 may find use in various applications, for example as a temperature sensor or as part of a feedback loop in a temperature regulating circuit.

Figure 2:
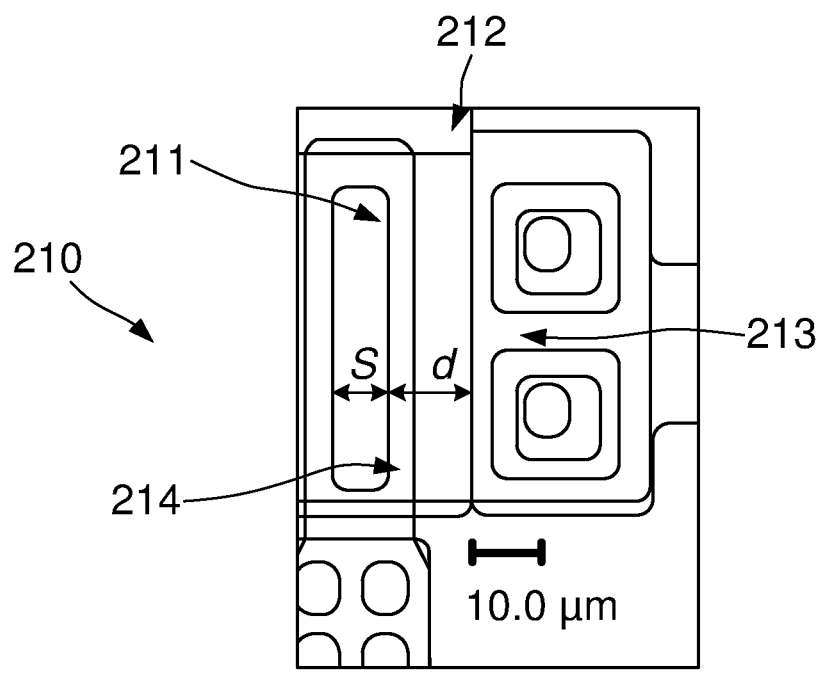
FIG. 2 illustrates a plan view of a poly-Si Schottky-barrier SGT, according to an embodiment of the present invention.

In some embodiments, the first transistor 110 and/or the second transistor 120 may be a source-gated transistor (SGT). FIG. 2 illustrates a plan view of a poly-Si Schottky-barrier SGT 210, according to an embodiment of the present invention. The SGT 210 shown in FIG. 2 comprises a source 211, gate 212, drain 213 and a field plate 214. In an SGT, the temperature dependence of the drain current is dependent on the source-gate overlap, S, which may also be referred to as the 'source length'. In embodiments in which thin-film transistors (TFTs) are used instead of SGTs, the equivalent parameter to the source length S in an SGT would be the channel length L. Accordingly, the relative temperature dependence of the output current of both transistors 110, 120 can be controlled simply by selecting an appropriate source-gate overlap, S, when SGTs are used. When other types of transistor are used, the first and second transistor may differ in another property that affects the temperature dependence. For example, some other types of thin film transistor (TFT) may have a temperature dependence that varies according to channel length L, and a desired PTD or NTD output current for the CM-type circuit may be obtained by selecting appropriate channel lengths L. In some embodiments, a combination of different types of transistor may be used. For example, in one embodiment one of the first and second transistors 110, 120 may be a non-SGT TFT, and the other one of the first and second transistors 110, 120 may be an SGT TFT.

Furthermore, in embodiments of the present invention the temperature dependence (TD) of the current $I_L$ at the drain 123 of the second transistor 120 can either be positive (PTD) or negative (NTD). In an SGT 210, such as the one illustrated in FIG. 2, the current injected from the drain-side edge of the source 211 has a high PTD, whereas the PTD reduces as S is increased since charge injection from the bulk of the source 211 begins to dominate. Distinct temperature behaviour can be obtained by varying S in otherwise identical devices. Therefore by appropriate selection of the output current temperature dependence of each of the first and second transistors 110, 120, embodiments of the present invention can provide circuits with relatively few components which have a highly-configurable TD of the output current $I_L$. If the relative width of the first and second transistors is not the same, the output current of the CM-type circuit will be amplified or reduced according to the width ratio of the transistors. However, the dependence of the output current on temperature will still be governed by the ratio of S between the two transistors.

Circuits such as the one 100 shown in FIG. 1, which can generate currents with a PTD or NTD depending on the relative TDs of the first and second transistors 110, 120, may prove useful in a wide range of applications, for example temperature sensing circuits and self-regulating circuits for overheat protection in compact devices, such as wearable electronics or sensor systems. Such circuits may be particularly suited for applications such as printed and flexible large area electronic circuits, since by enabling a current with the desired PTD or NTD characteristic to be generated using a small number of components, embodiments of the present invention can help to increase reliability and improve manufacturing yields.

Figure 3:
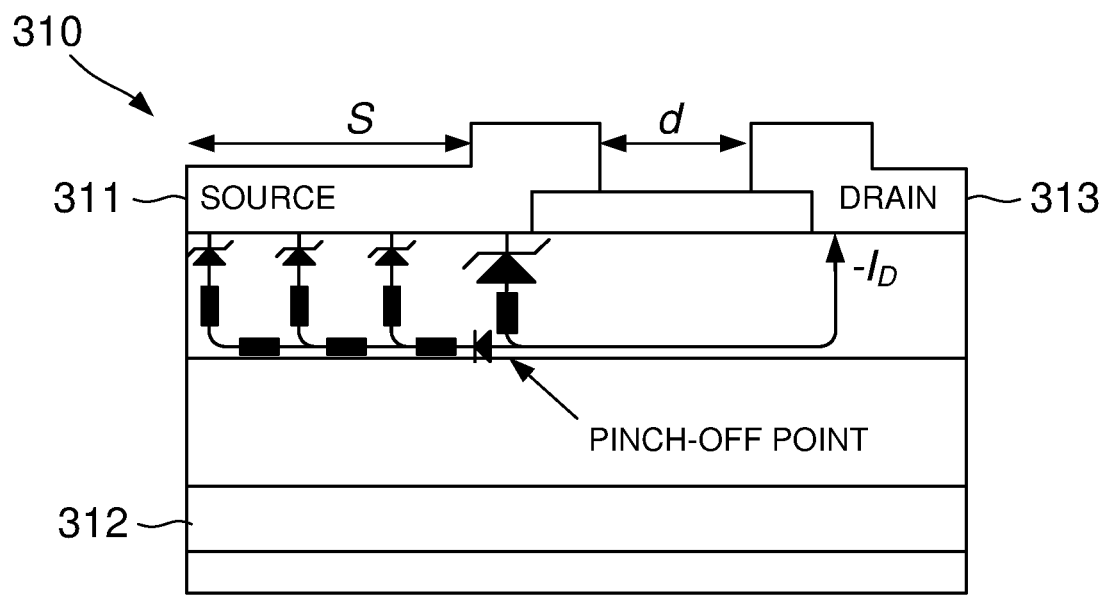
FIG. 3 illustrates a cross-section through a poly-Si Schottky-barrier SGT, according to an embodiment of the present invention.
Figure 4:
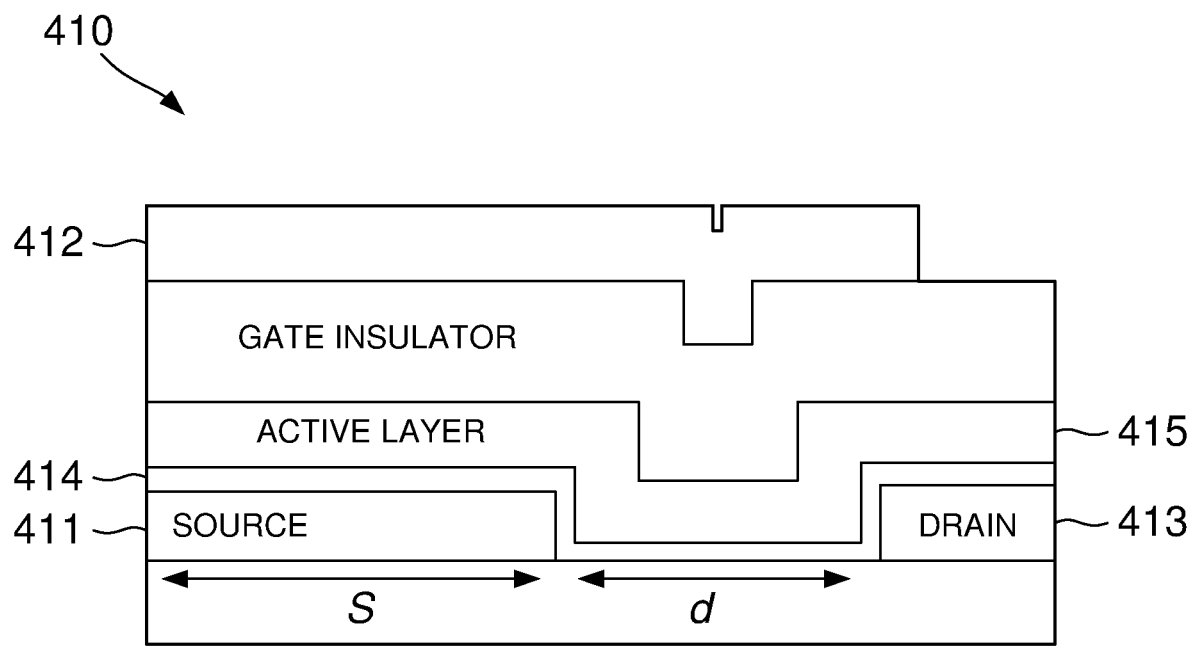
FIG. 4 illustrates a cross-section through an indium-gallium-zinc oxide (IGZO) SGT, according to an embodiment of the present invention.

Although a poly-Si Schottky-barrier SGT 210 is illustrated in FIG. 2, in other embodiments of the present invention different types of transistors may be used as the first and second transistors 110, 120. FIG. 3 illustrates a cross-section through a low-temperature poly-Si (LTPS) Schottky-barrier SGT according to another embodiment of the present invention, while FIG. 4 illustrates a cross-section through a tunnel-contact SGT according to a further embodiment of the present invention. In the embodiment of FIG. 4 the tunnel-contact SGT is formed from indium-gallium-zinc oxide (IGZO), but in other embodiments any other suitable material may be used. The LTPS SGT 310 of FIG. 3 comprises a source 311, gate 312, and drain 313. The IGZO SGT 410 of FIG. 4 also comprises a source 411, gate 412, and drain 413, and further comprises an insulating layer 414 disposed between a semiconductor active layer 415 and the source 411 and drain 413. FIG. 3 illustrates the different charge injection paths from the bulk and at the drain-side edge of the source in the LTPS transistor 310, and similar paths will also apply in the IGZO transistor 410.

Furthermore, although particular TFT structures are illustrated in FIGS. 2 to 4, in other embodiments of the invention different types of transistors to those illustrated in FIGS. 2 to 4 may be used, for example using different materials and/or different structures. For example, although in the present embodiment the insulating layer 414 is disposed over the source-drain gap as well as over the source and drain electrodes 411, 413, in other embodiments the insulating layer 414 may only be disposed over the source electrode 411, and omitted from the source-drain gap and the drain electrode 413.

Table 1, below, summarises the device parameters of the LTPS SGT 310 of FIG. 3 and the IGZO SGT 410 of FIG. 4, together with simulation parameters used in technology computer-aided design (TCAD) simulations. It will be appreciated that the dimensions and materials listed below are provided merely as an illustrative example to aid understanding of the invention, and should not be construed as limiting. In other embodiments the first and second transistors 110, 120 may use different materials and/or different dimensions to those listed in Table 1, or may comprise different types of TFT which have different temperature dependencies (e.g. one transistor may be an SGT TFT and the other may be another type of TFT).

TABLE I

| Parameter | LTPS | TCAD | IGZO |
|---|---|---|---|
| Architecture | TCBG | TCBG | BCTG |
| Device width | 50 μm | 1 μm (2-D) | 110 μm |
| S/D contact material | Cr/AlTi/Cr | Cr | Ni |
| Tunnel layer material | — | — | 3 nm $Al_2O_3$ |
| Active layer thickness | 40 nm Poly-Si | 30 nm Poly-Si | 35 nm IGZO |
| Gate insulator | 200 nm $SiN_x$ | 60 nm $SiO_2$ | 98 nm ALD $Al_2O_3$ |
| Field plate extension | 4 μm drawn | 0.5 μm | — |
| Field plate height | 120 nm $SiO_2$ | 20 nm $SiO_2$ | — |
| Source-drain gap (d in SGT, L in TFT) | 6 μm and 10 μm | 3 μm | 6.5 μm and 50 μm |
| Source length (S) | 2 μm and 8 μm | 1, 5 and 25 μm | 1 μm and 45 μm |

Figure 5:
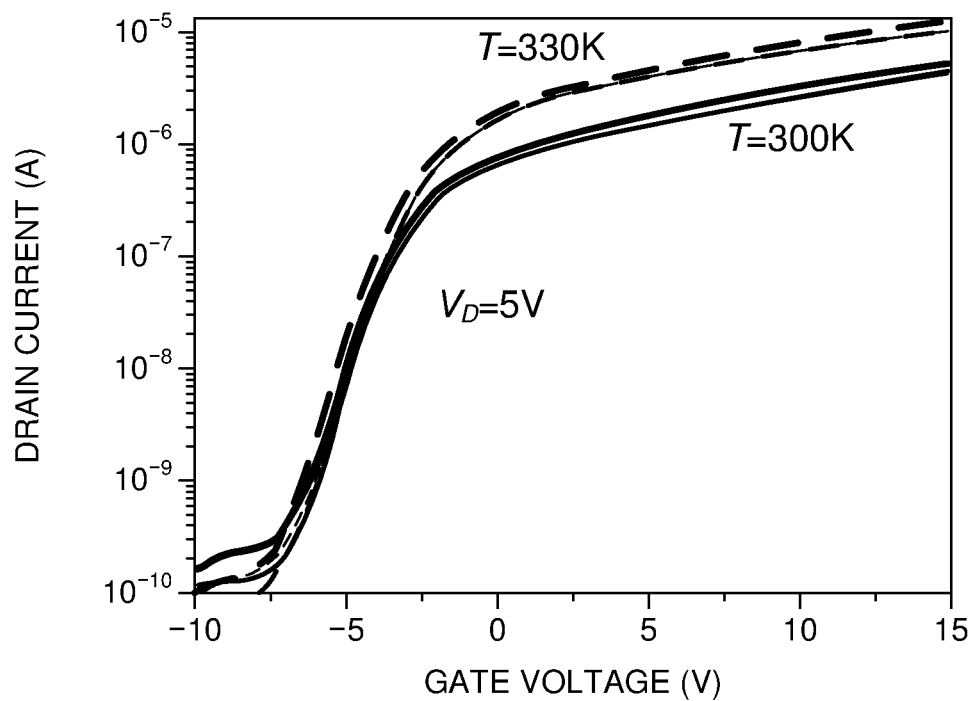
FIG. 5 is a graph showing measured transfer characteristics of poly-Si SGTs, according to embodiments of the present invention.
Figure 6:
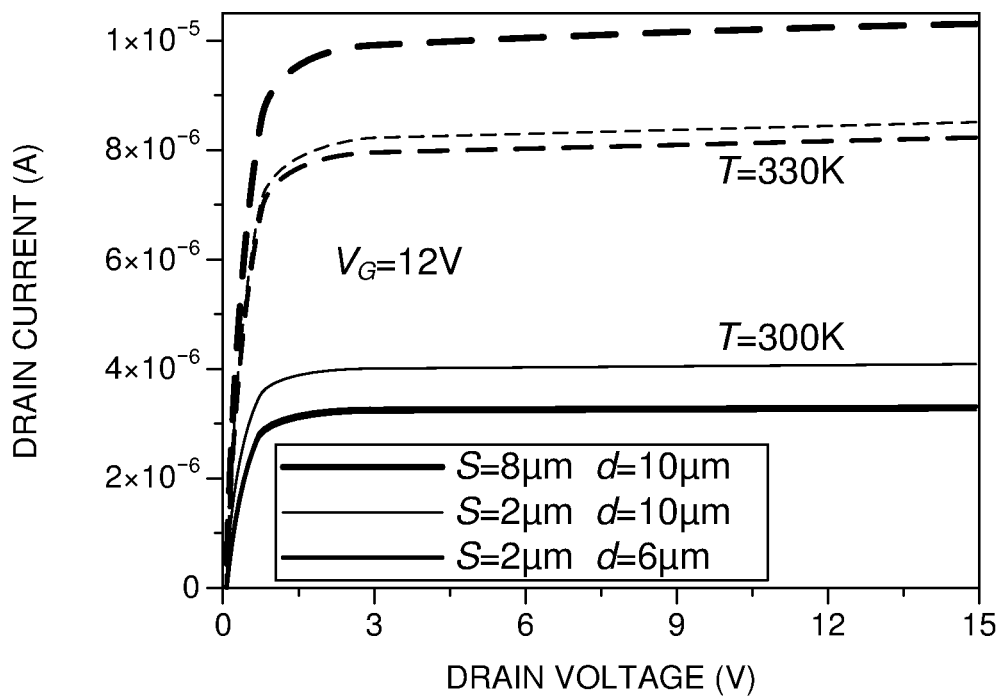
FIG. 6 is a graph showing measured output characteristics of poly-Si SGTs, according to embodiments of the present invention.

FIGS. 5 and 6 illustrate graphs showing measured electrical data for poly-Si SGTs similar to the SGT 310 of FIG. 3. The transfer characteristics are plotted in FIG. 5 for varying combinations of S and d, at temperatures T=300 K and T=330 K, for a constant drain voltage $V_D$ of 5 V. FIG. 6 plots the output characteristics for the same combinations of S and d as in FIG. 5, at T=300 K and T=330 K, for a constant gate voltage $V_G$ of 12 V. In the present embodiment the SGTs operate in depletion due to bulk doping, and show typical low-voltage saturation and independence of drain current on d. Furthermore, as shown in FIG. 6 the saturated drain current is practically independent of the drain voltage. This can be a desirable property, since as a result the output current is insensitive to variations in the resistance of the load on the circuit $R_L$ (or equivalently, to variations in the power supply voltage). Due to the 2-D charge injection process in an SGT, the temperature dependence of the drain current is marginally higher for the device with a shorter source. In embodiments of the present invention, this behaviour can be exploited in circuits similar to the one shown in FIG. 1 to generate NTD and PTD currents.

Figure 7:
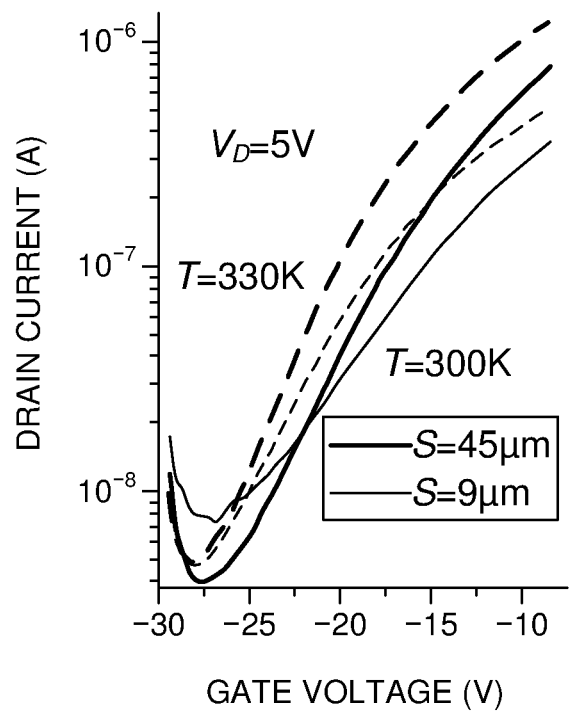
FIG. 7 is a graph showing measured transfer characteristics of IGZO SGTs, according to embodiments of the present invention.
Figure 8:
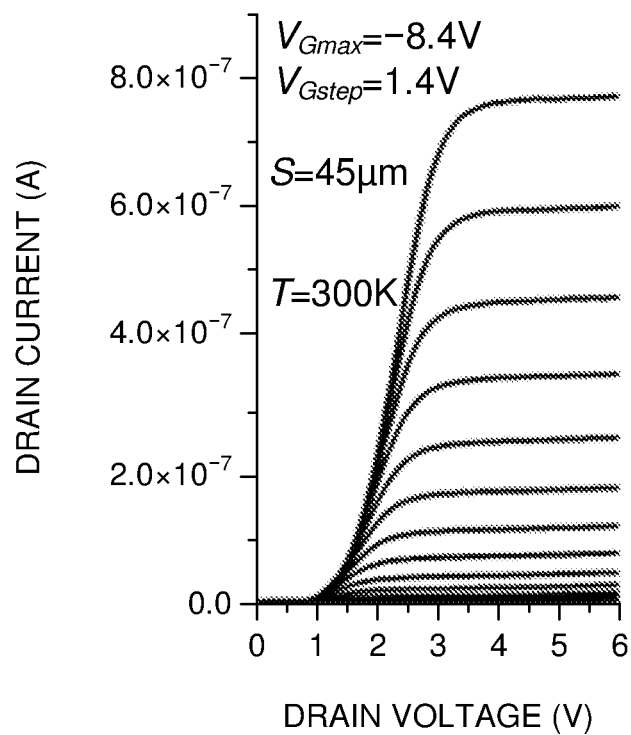
FIG. 8 is a graph showing measured output characteristics of an IGZO SGT, according to an embodiment of the present invention.

FIGS. 7 and 8 illustrate graphs showing measured electrical data for IGZO SGTs similar to the SGT 410 of FIG. 4. The transfer characteristics are plotted in FIG. 7 for devices with S=45 μm and S=9 μm, both with d=50 μm, at temperatures T=300 K and T=330 K, for a constant drain voltage $V_D$ of 5 V. FIG. 7 shows that the drain current PTD is larger for the device with the longer source. FIG. 8 plots the output characteristics for the device with S=45 μm at T=300 K, for various values of the gate voltage $V_G$, and shows that the device demonstrates SGT behaviour. Low-voltage behaviour is supra-linear, but does not impede functionality in a CM-type circuit such as the one shown in FIG. 1, in which the transistors operate in saturation.

Figure 9:
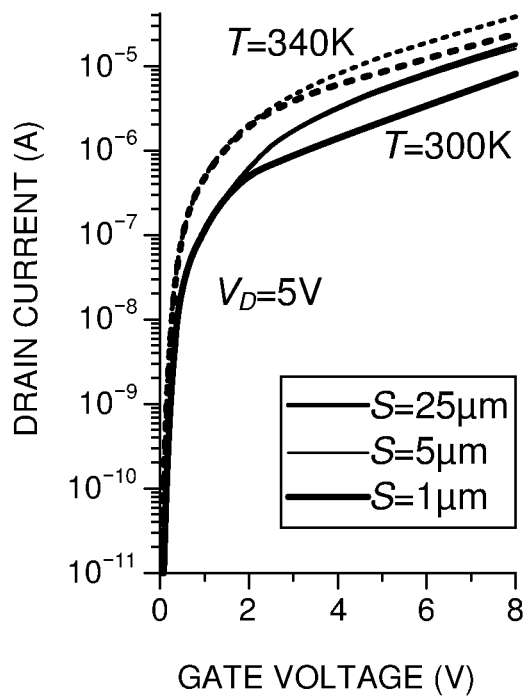
FIG. 9 is a graph showing simulated transfer characteristics of poly-Si SGTs, according to embodiments of the present invention.
Figure 10:
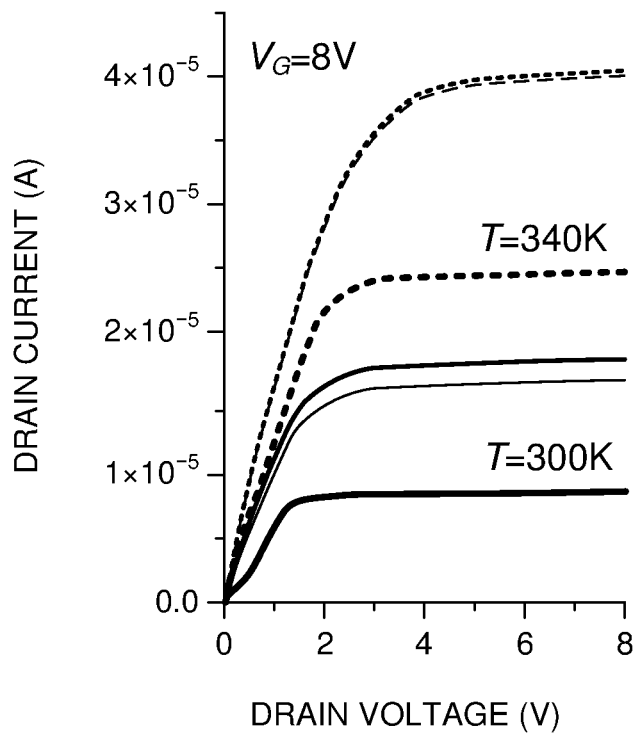
FIG. 10 is a graph showing simulated output characteristics of poly-Si SGTs, according to embodiments of the present invention.

FIGS. 9 and 10 illustrate TCAD thermal and electrical co-simulation results for poly-Si enhancement-mode devices using Silvaco Atlas v. 5.24.1.R, according to an embodiment of the present invention. The device parameters used in the simulations are given in Table 1. The simulated transfer characteristics are plotted in FIG. 9 for poly-Si SGT devices with S=1 μm, S=5 μm and S=25 μm at temperatures T=300 K and T=340 K, for a constant drain voltage $V_D$ of 5 V. FIG. 10 plots the output characteristics for the same devices as in FIG. 9, at T=300 K and T=340 K, for a constant gate voltage $V_G$ of 8 V.

As shown in FIGS. 9 and 10, the simulated poly-Si SGTs exhibit similar characteristics to the fabricated poly-Si SGTs in FIGS. 6 and 7. The simulated device with S=1 μm has reduced drain current due to the small source area. Also, the drain current in this device has a large PTD, as injection from the source edge dominates. The simulated devices with S=5 μm and S=25 μm behave very similarly, indicating that in both of these devices the injection from the bulk of the source not only dominates, but saturates with increasing S as early as 5 μm. In other words, increasing the source length from 1 to 5 μm has a relatively large impact on the temperature dependence of the drain current, whereas continuing to increase the source length beyond 5 μm has relatively little effect on both the magnitude of the output current and its temperature dependence.

Therefore for any given device geometry and combination of materials, a threshold source length $S_{Tsat}$ exists at which saturation of the temperature dependence occurs, such that increasing the source length beyond this threshold value $S_{Tsat}$ has a negligible effect on the drain current. In embodiments of the present invention, a greater contrast in the TD between the first and second transistors 110, 120, and consequently a more strongly PTD or NTD output current, can be obtained by choosing a source length S for one of the transistors 110, 120 that is at or above the threshold source length $S_{Tsat}$, and choosing a source length S for the other transistor that is below the threshold source length $S_{Tsat}$. An output current with a stronger dependence on temperature, either highly PTD or highly NTD, can be obtained by choosing a source length S for the other transistor that is far below the threshold source length $S_{Tsat}$.

Referring now to FIGS. 11 to 14, top views of CM-type circuits similar to the one shown in FIG. 1 using SGTs are illustrated, according to embodiments of the present invention. As with the embodiment of FIG. 1, each circuit shown in FIGS. 11 to 14 includes a first transistor comprising a first source 111, first gate 112 and first drain 113, and a second transistor comprising a second source 121, second gate 122 and second drain 123. In the embodiments of FIGS. 11 to 14, the first gate 112 and the second gate 122 comprise respective parts of a single gate terminal, such that the single gate terminal acts as a common gate for the first and second transistors.

Figure 11:
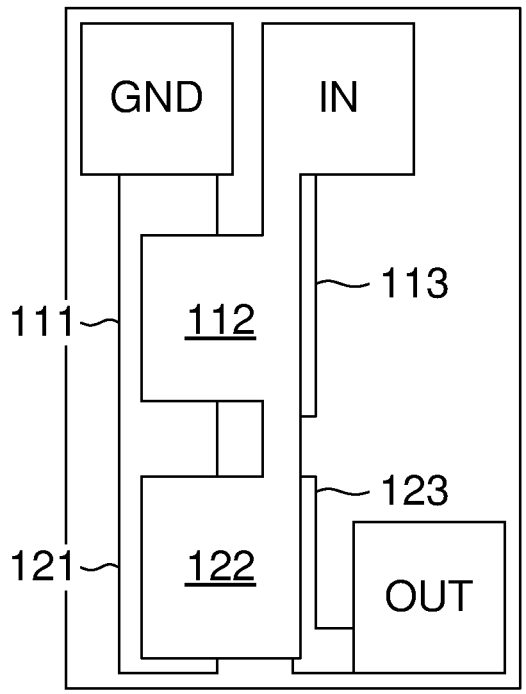
FIG. 11 illustrates a top view of a current mirror (CM)-type circuit using SGTs in which the first and second transistors have the same source length S and the same source-drain gap d, according to an embodiment of the present invention.
Figure 12:
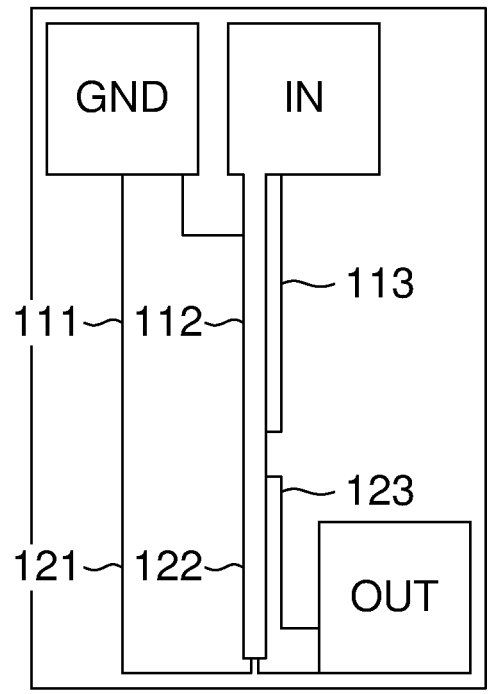
FIG. 12 illustrates a top view of a CM-type circuit using SGTs in which the first and second transistors have the same source length S and the same source-drain gap d, according to an embodiment of the present invention.

FIG. 11 illustrates an embodiment in which the first and second transistors have the same source length S and the same source-drain gap d. FIG. 12 also illustrates an embodiment in which the first and second transistors have the same source length S and the same source-drain gap d is illustrated, but with smaller values of S and d than in the embodiment of FIG. 11. Since the first and second transistors have identical dimensions in both cases, if identical materials were used in the first and second transistors then the circuit would behave as an ideal current mirror. However, in some embodiments of the present invention a difference between the TDs of the first and second transistors may be produced by using different materials and/or dopant levels in the first and second transistors. In such embodiments, the first and second transistors may have the same dimensions as each other or may have different dimensions.

Figure 13:
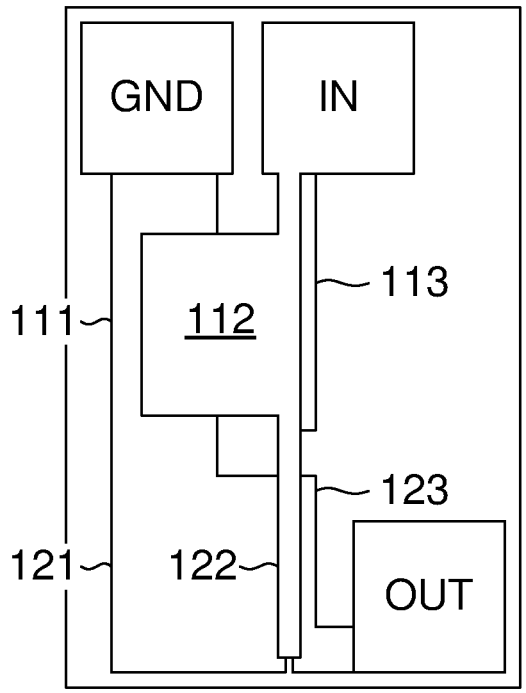
FIG. 13 illustrates a top view of a CM-type circuit using SGTs in which the first transistor has a greater source length S and source-drain gap d than the second transistor, according to an embodiment of the present invention.
Figure 14:
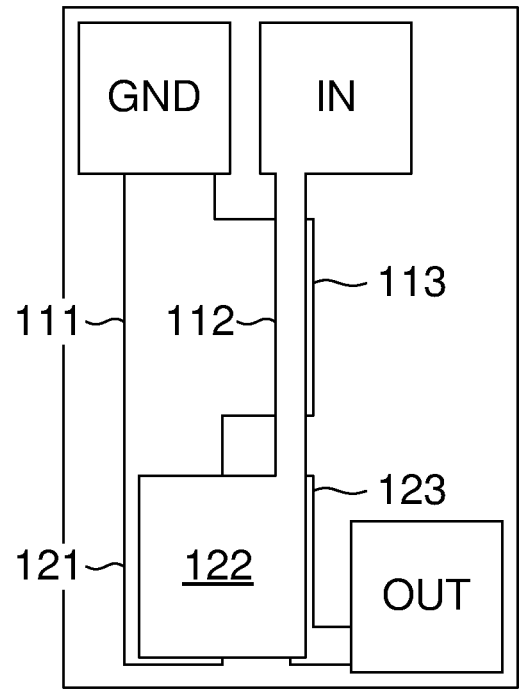
FIG. 14 illustrates a top view of a CM-type circuit using SGTs in which the first transistor has a smaller source length S and source-drain gap d than the second transistor, according to an embodiment of the present invention.

FIGS. 13 and 14 illustrate embodiments in which the first transistor has a different value of S and/or a different value of d to the second transistor, with the result that the first and second transistors have different TDs. In FIG. 13, the first transistor has a larger source length S and a larger source-drain gap d than the second transistor. In FIG. 14, the first transistor has a smaller source length S and a smaller source-drain gap d than the second transistor. Since the first and second transistors have different source lengths S in FIGS. 13 and 14, in both embodiments the first and second transistors may be formed from the same materials and will still exhibit different TDs. However, in some embodiments transistors with different source lengths S such as the examples shown in FIGS. 13 and 14 may also be formed from different materials to each other.

Figure 15:
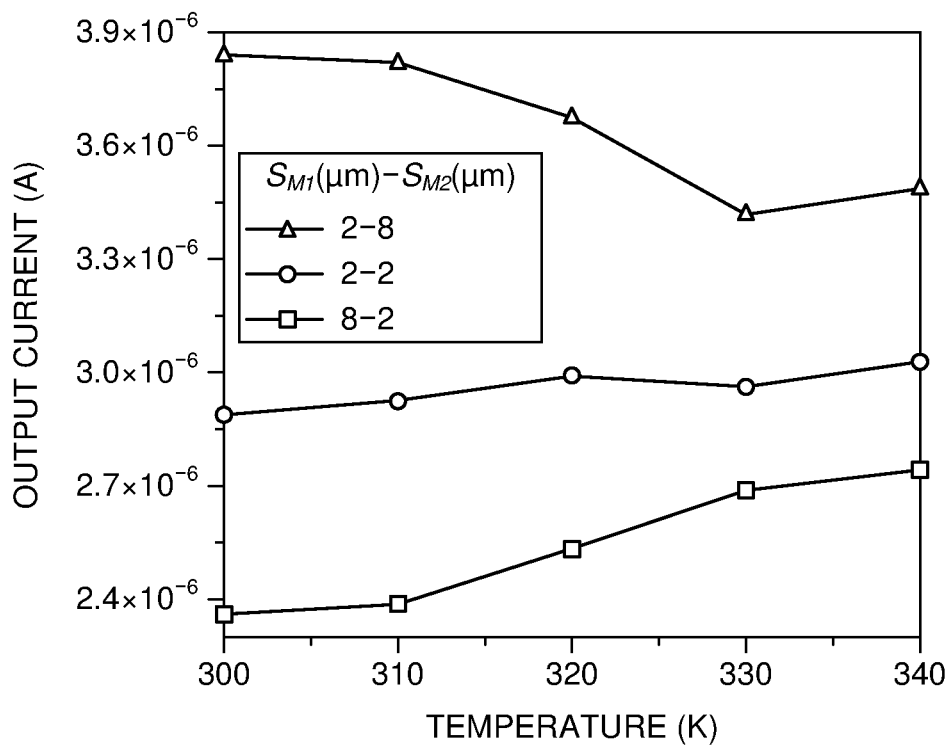
FIG. 15 is a graph showing the measured dependence of output current on temperature for CM-type circuits comprising SGTs, according to embodiments of the present invention.
Figure 16:
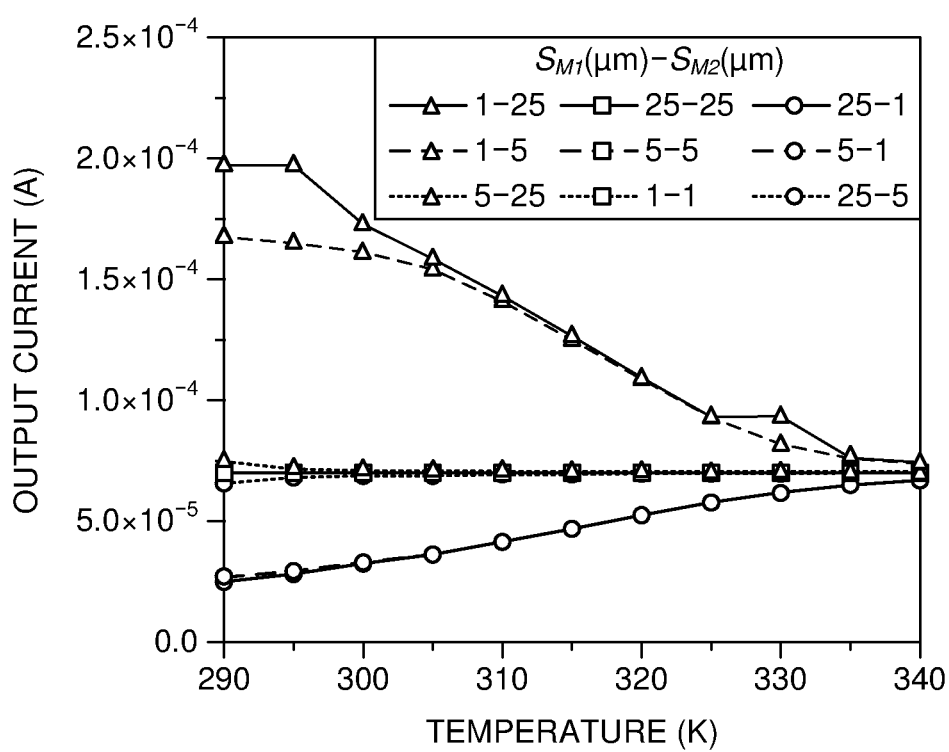
FIG. 16 is a graph showing the simulated dependence of output current on temperature for CM-type circuits using SGTs with different combinations of S, according to embodiments of the present invention.

Referring now to FIGS. 15 and 16, measured and simulated data for CM-type circuits comprising SGTs with different source lengths S are illustrated, according to embodiments of the present invention. FIG. 15 is a graph showing the measured dependence of output current on temperature for CM-type circuits comprising poly-Si SGTs. Specifically, data is plotted in FIG. 15 for: a circuit comprising a first transistor (M1) with $S_{M1}$=2 μm and a second transistor (M2) with $S_{M2}$=8 μm; a circuit comprising a first transistor (M1) with $S_{M1}$=2 μm and a second transistor (M2) with $S_{M2}$=2 μm; and a circuit comprising a first transistor (M1) with $S_{M1}$=8 μm and a second transistor (M2) with $S_{M2}$=2 μm.

As shown in FIG. 15, in the embodiment in which the first transistor has a smaller source length S than the second transistor ($S_{M1}$<$S_{M2}$), the overall TD of the output current is negative, meaning that the magnitude of the output current decreases as a temperature of the first and second transistors increases. This arises because the PTD of the first transistor's drain current is higher than that of the second transistor, which in the case of Schottky-contact SGTs in silicon can be obtained by using a shorter source length S in the first transistor, as shown for example in the embodiment of FIG. 14. In such embodiments, when the first transistor is driven with a constant current, $I_{ref}$, an increase in the global temperature of the circuit will result in a reduction of gate voltage for both the first and second transistors. However, since the second transistor has a lower PTD than the first transistor, due to the longer source length S of the second transistor, the drain current of the second transistor (i.e. the output current of the circuit) reduces with temperature. In the data plotted in FIG. 15, an average temperature sensitivity output current (TSOC) of −0.53%/K is observed for the embodiment with $S_{M1}$=2 μm and $S_{M2}$=8 μm.

Conversely, in other embodiments a PTD output current can be obtained by using a second transistor with a shorter source length S than the first transistor, as is the case in the embodiment shown in FIG. 13. In the data plotted in FIG. 15, a TSOC of +0.64%/K is observed for the embodiment with $S_{M1}$=8 μm and $S_{M2}$=2 μm. For the embodiment with identical transistors with $S_{M1}$=$S_{M2}$=2 μm, the TSOC is virtually negligible at +0.06%/K, indicating that the device is behaving close to an ideal current mirror.

FIG. 16 is a graph showing the simulated dependence of output current on temperature for CM-type circuits using poly-Si SGTs with different combinations of S and d, according to embodiments of the present invention. The output current temperature dependence in FIG. 16 was simulated under direct current (DC) conditions. In comparison to the measured data plotted in FIG. 15, the TCAD simulations plotted in FIG. 16 show similar behaviour but with a larger TSOC, due to the larger difference in the source lengths S between devices. In the simulation of a device with $S_{M1}$=1 μm and $S_{M2}$=25 μm, a TSOC of −1.83%/K is observed, whilst in the simulation of a device with $S_{M1}$=25 μm and $S_{M2}$=1 μm a TSOC of +3.15%/K is observed. A negligible TSOC of +0.002%/K is observed for embodiments in which the first and second transistors have identical source lengths ($S_{M1}$=$S_{M2}$=1, 5, 25 μm).

As described above with reference to FIG. 10, a threshold source length $S_{Tsat}$ exists beyond which increasing the source length further has little or no effect on the drain current. For the device geometry and materials used in the TDAC simulations plotted in FIG. 16, this threshold $S_{Tsat}$ occurs close to S=5 μm. For example, in the present embodiment the threshold $S_{Tsat}$ may be around 10 μm. Also, as described above, a greater contrast in the TD between the first and second transistors 110, 120, and consequently a more strongly PTD or NTD output current, can be obtained by choosing a source length S for one of the transistors 110, 120 that is at or above the threshold source length $S_{Tsat}$, and choosing a source length S for the other transistor that is below the threshold source length $S_{Tsat}$.

This effect can be seen in FIG. 16, since the devices with $S_{M1}$=1 μm, $S_{M2}$=5 μm and $S_{M1}$=1 μm, $S_{M2}$=25 μm both generate an output current that is strongly NTD, whereas the device with $S_{M1}$=5 μm, $S_{M2}$=25 μm generates an output current that is only very weakly NTD. Similarly, the devices with $S_{M1}$=25 μm, $S_{M2}$=1 μm and $S_{M1}$=5 μm, $S_{M2}$=1 μm both generate an output current that is strongly PTD, whereas the device with $S_{M1}$=25 μm, $S_{M2}$=5 μm generates an output current that is only very weakly PTD. Therefore by choosing a source length S for one of the transistors 110, 120 that is at or above the threshold source length $S_{Tsat}$, and choosing a source length S for the other transistor that is below the threshold source length $S_{sat}$, a CM-type circuit can be obtained which has a greater sensitivity to changes in temperature.

Also, as shown in FIG. 16 the temperature-current curves of the devices exhibit an approximately linear portion between about 305 K and 325 K, with non-linear behaviour outside of this temperature range. In some embodiments the apparatus 100 is configured to operate in a temperature range between an upper temperature threshold and a lower temperature threshold, wherein the upper and lower temperature thresholds are temperatures within a linear portion of the respective temperature-current curves of the first and second transistors. In this way, the output current of the apparatus 100 remains approximately linearly proportional to the temperature throughout the designed operating range, making it easy to convert the magnitude of the output current to a measurement of temperature. In some applications it may be preferable to have an output current that varies with temperature in a non-linear manner, for example to make the output current more sensitive to temperature changes within a certain range of temperatures.

Figure 17:
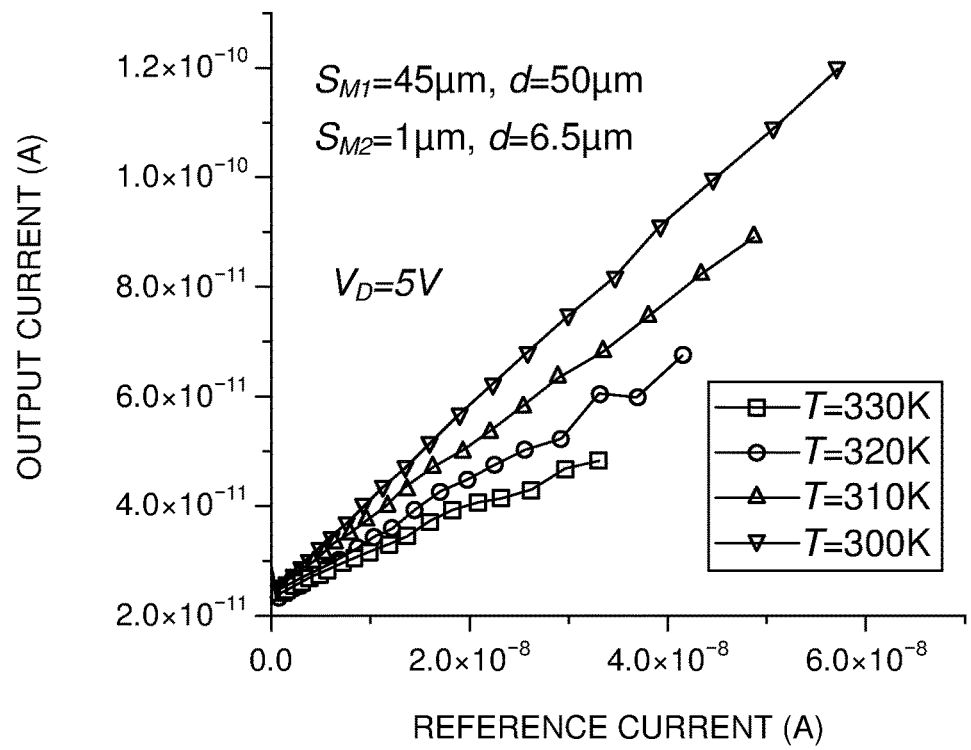
FIG. 17 is a graph of output current vs reference current at various temperatures for a CM-type circuit using SGTs, according to an embodiment of the present invention.

Referring now to FIG. 17, a graph of output current vs reference current at various temperatures for a current mirror circuit using IGZO SGTs is illustrated, according to an embodiment of the present invention. The data plotted in FIG. 17 shows that IGZO circuits achieve the same net effect as the poly-Si-based circuits described above. In the present embodiment, in which the first transistor has a drain current with a higher PTD than the second transistor, a TSOC of −1.17%/K is obtained.

Figure 18:
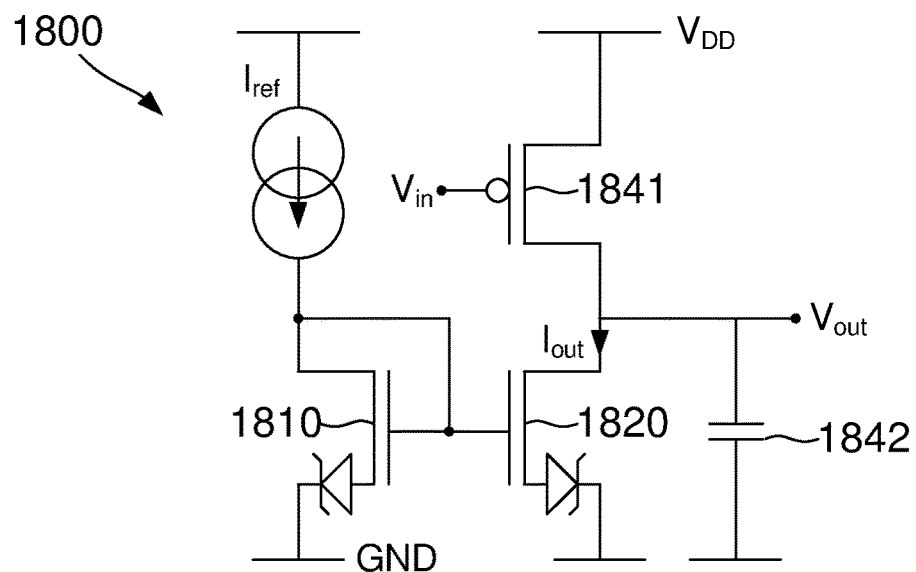
FIG. 18 illustrates a CM-type circuit using n-type SGTs and a constant current source, according to an embodiment of the present invention.
Figure 19:
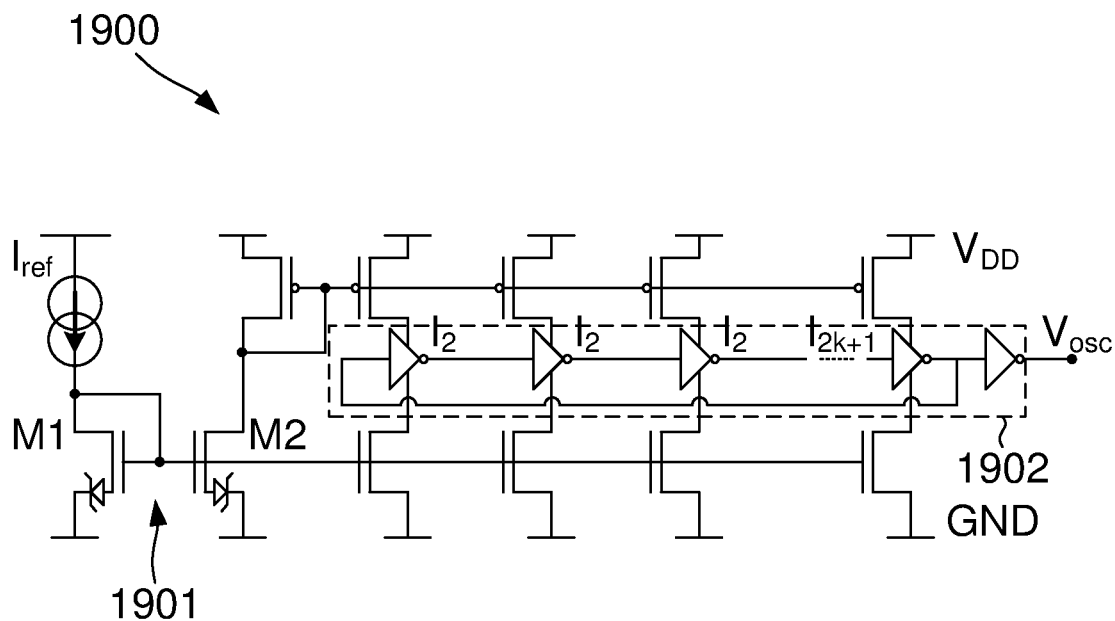
FIG. 19 illustrates apparatus comprising a ring oscillator circuit driven by an inverter stage similar to the one shown in FIG. 18, according to an embodiment of the present invention.

Referring now to FIGS. 18 and 19, apparatus comprising a ring oscillator circuit 1902 is illustrated according to an embodiment of the present invention. FIG. 18 illustrates a circuit comprising first and second transistors 1810, 1820 connected in a CM-type arrangement similar to the one shown in FIG. 1. In addition, the circuit of FIG. 18 comprises a third transistor 1841 have a source connected to the drain of the second transistor 1820. The voltage at the source of the third transistor 1841, $V_{out}$, is provided to one terminal of a capacitor 1842, the other terminal of which is connected to ground.

FIG. 19 illustrates apparatus 1900 based on the one shown in FIG. 18, comprising first and second transistors 1901 connected in a CM-type circuit similar to the one shown in FIG. 1, and comprises an oscillator core 1902 driven by an array of third transistors 1830, each of which receive the current copied from the second transistor 1820. Each stage of the ring oscillator contains a signal amplification stage with signal-inverting properties, which in the present embodiment comprises an inverter logic gate. Each stage comprises an arrangement similar to the second and third transistors 1820, 1841 in FIG. 18. The third transistors 1841 in all of the stages may have their gates connected together as the input and their drains connected together as the output, with the output of each stage serving as the input for the next stage. In some embodiments the third transistor 1841 may be used as the inverter, provided that the second transistor 1820 is replicated at the bottom of each stage, as shown in the lower row of transistors in FIG. 19.

The oscillator circuit 1902 is disposed close to the first and second transistors 1901, such that the temperature of the first and second transistors 1901 is influenced by the temperature of the oscillator circuit 1902. The heating effect on the first and second transistors due to the oscillator circuit depends upon a magnitude of a current flowing through the oscillator circuit, and may also depend on an external temperature. In this way, the oscillator circuit can increase the temperature of the first and second transistors through Joule heating, by increasing the current flowing through the oscillator circuit.

In the present embodiment, the oscillator circuit 1902 is a current-starved ring oscillator circuit and the second transistor is one of a plurality of second transistors the current-starved ring oscillator circuit. The oscillator circuit 1902 comprises a plurality of stages each comprising one of the second transistors, and each second transistor comprises a respective second gate electrode configured to receive the same gate voltage as the first gate. In this way, the output current $I_L$ is copied to each stage of the oscillator circuit 1902, such that a change in the output current at transistor M2 results in a corresponding change in the current flowing through each stage of the oscillator circuit 1902. When the output current at the drain of the second transistor M2 has a negative temperature dependence, the current-starved ring oscillator 1902 adapts its operating frequency according to temperature of the apparatus 1900 through a negative feedback mechanism. Additionally, when the CM-type circuit 1901 is configured to generate a NTD output current, the current-starved ring oscillator 1902 will self-regulate the operating speed and power dissipation of any other circuitry driven by the oscillator circuit 1902. In some embodiments, a precise clock may be generated separately by a circuit configured to generate a stable clock signal that is independent of temperature.

Together, the first and second transistors 1901 and the oscillator circuit 1902 form a feedback loop such that the apparatus acts as a temperature regulating circuit, due to the negative temperature dependence of the output current at the drain of the second transistor M2. Additionally, the oscillator circuit 1902 may be powerful enough to influence the temperature of a surrounding environment of the apparatus 1900, and/or may be configured to drive a separate heating or cooling device. In this way, the temperature regulating circuit can be used to maintain a surrounding environment of the apparatus 1900 at a substantially constant temperature. For example, the apparatus 1900 may be included in a wearable electronic device and used to regulate the temperature in at least part of the wearable electronic device. In some embodiments the circuit may be integrated into a garment, to help regulate the temperature of a person wearing the garment.

For example, in some embodiments the output of an oscillator circuit 1902 such as the one shown in FIG. 19 may be used as a timing signal to an additional circuit, such that the frequency of the timing signal that is provided to the additional circuit changes according to temperature. The additional circuit can be configured to produce a heating or cooling effect that is dependent on the frequency of the timing signal provided by the operating circuit 1902, and so may be referred to as a temperature control circuit. For example, the temperature control circuit may be configured to dissipate heat in proportion to its operating frequency as controlled by the timing signal from the oscillator circuit 1902. In this way, an increase in the temperature of the first and second transistors 1901 reduces the frequency of the timing signal generated by the oscillator circuit 1902, thereby causing the heat dissipation in the temperature control circuit to reduce, and consequently reducing the temperature of the first and second transistors 1901. This arrangement can ensure that the temperature control circuit is kept in safe operating limits with respect temperature, for example, or can ensure that the heat dissipated by the temperature control circuit is not raising the temperature to a level that could be harmful for the user or for other components of the system.

In other embodiments a circuit similar to the one shown in FIG. 19 may be provided, in which the first and second transistors 1901 are configured to produce an output current at the drain of the second transistor M2 that has a positive dependence on temperature. In this case, the oscillator circuit frequency increases with temperature, and can be used as a sensitive temperature sensor. For example, a counter may be used to determine the frequency of the oscillator circuit and convert this to a measurement of temperature.

The oscillator circuit 1902 can be referred to more generally as a temperature controller, since the function of the oscillator circuit 1902 is to control the temperature of the first and second transistors 1901 and the surrounding environment. Although in the present embodiment the temperature controller is an oscillator circuit, in other embodiments different types a temperature controller may be implemented differently. For example, in some embodiments a CM-type circuit such as the one shown in FIG. 1 could be connected to a temperature controller in the form of a Peltier device, with the first and second transistors either being disposed on the hot side or on the cool side of the Peltier device. In this way, the Peltier device can either heat or cool the first and second transistors, as well as the surrounding environment, with the magnitude of the heating or cooling effect being dependent on the output current provided by the drain of the second transistor.

Figure 20:
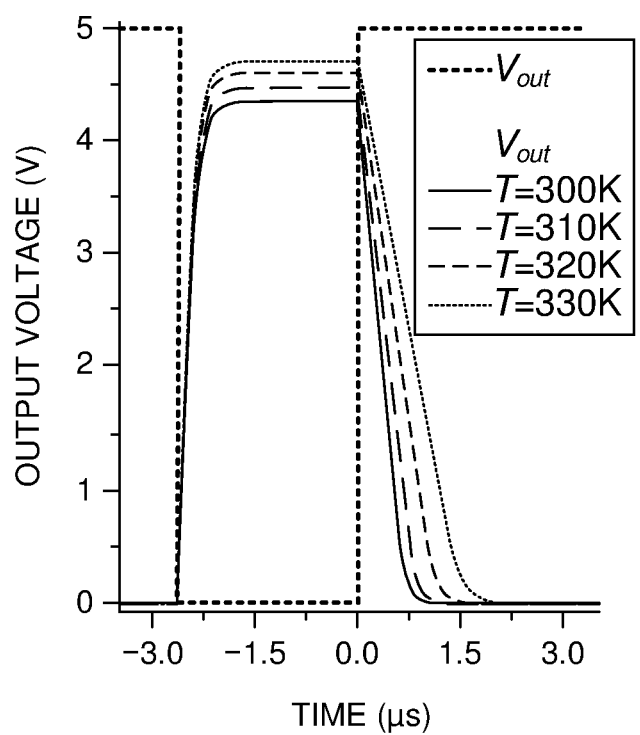
FIG. 20 is a graph showing the inverter stage delay dependence on temperature for the ring oscillator circuit of FIG. 19, according to an embodiment of the present invention.

Referring now to FIG. 20, a graph showing the inverter stage delay dependence on temperature for the circuit of FIG. 18 included in the circuit of FIG. 19 is illustrated, according to an embodiment of the present invention.

Apparatus similar to the one shown in FIG. 18 was simulated as part of the circuit shown in FIG. 19 using the Atlas mixed-mode capability described above in relation to FIG. 16, in which a SPICE circuit is described and simulated using both SPICE (i.e. capacitors) and Atlas (physically-modelled) devices. The common-source amplifier shown in FIG. 18 uses the CM-type circuit as an active load and is driven with a square wave. Transient simulations were used to study the time-response of the circuits, and the simulation results are plotted in FIGS. 20 to 23.

Figure 21:
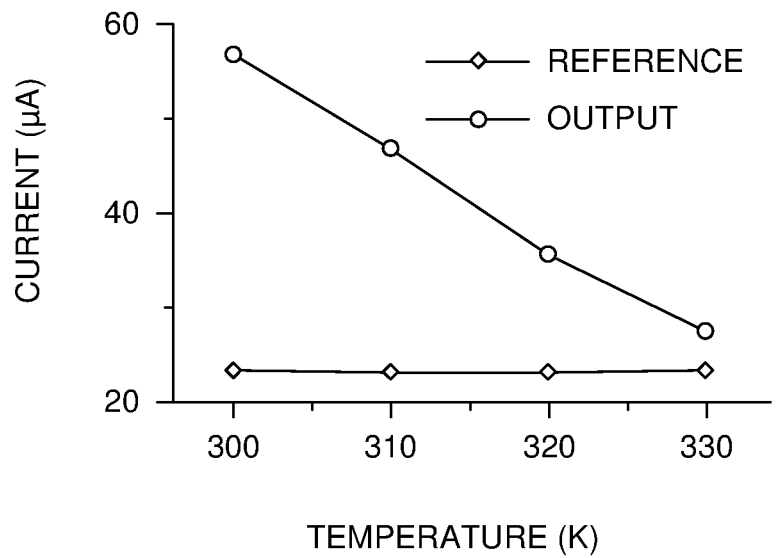
FIG. 21 is a graph showing the evolution with temperature of the output current of the inverter stage for the ring oscillator circuit of FIG. 19, according to an embodiment of the present invention.
Figure 22:
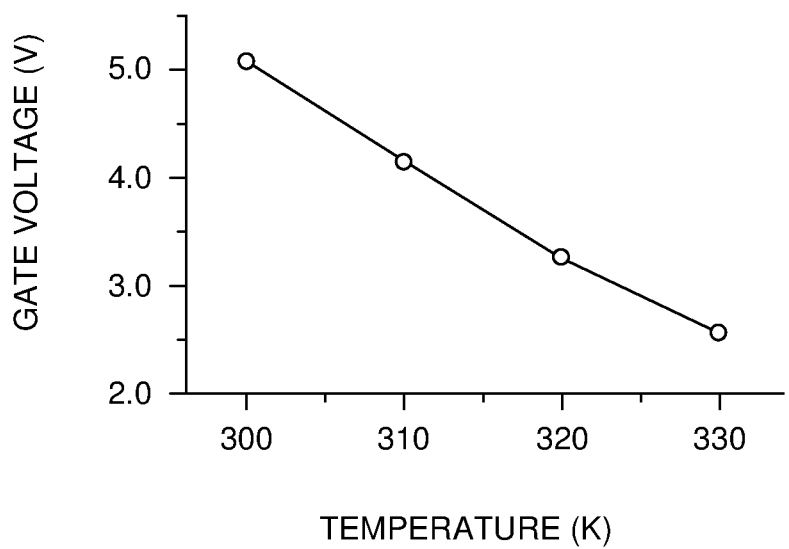
FIG. 22 is a graph showing the evolution with temperature of the gate voltage of the inverter stage of the ring oscillator circuit of FIG. 19, according to an embodiment of the present invention.
Figure 23:
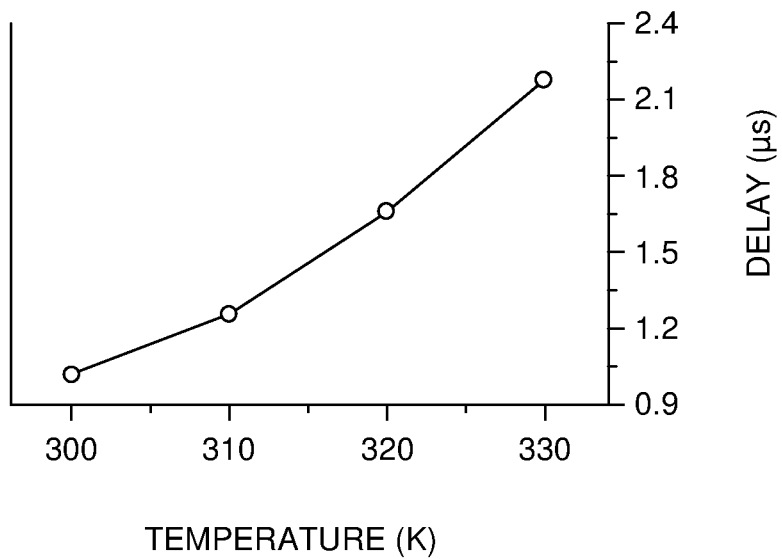
FIG. 23 is a graph showing the evolution with temperature of the switching delay of the inverter stage for the ring oscillator circuit of FIG. 19, according to an embodiment of the present invention.

As shown in FIG. 20, as the temperature of the apparatus 1800 rises the output current $I_{out}$ of the CM-type circuit reduces, since in the present embodiment the first and second transistors 1810, 1820 are configured to produce a NTD output current $I_{out}$. Consequently, the time taken for the load capacitor 1842 (CL=10 pF) to discharge is increased, and the operating speed and therefore the heat dissipation of the oscillator circuit 1902 in FIG. 19 decreases. This constitutes a negative feedback loop, since an increase in temperature of the apparatus 1900 results in less heat being generated by the oscillator circuit 1902. FIG. 21 is a graph illustrating the evolution with temperature of the output current of the inverter stage 1800 for the oscillator circuit 1902, and shows that the output current decreases as the temperature of the oscillator circuit 1902 increases. FIG. 22 is a graph illustrating the evolution with temperature of the gate voltage of the inverter stage 1800 for the oscillator circuit 1902, and shows that the gate voltage decreases as the temperature of the oscillator circuit 1902 increases. FIG. 23 is a graph illustrating the evolution with temperature of the switching delay of the inverter stage 1800 for the oscillator circuit 1902, and shows that the switching delay increases as the temperature increases, causing the operating speed of the oscillator circuit 1902 to reduce.

Figure 24:
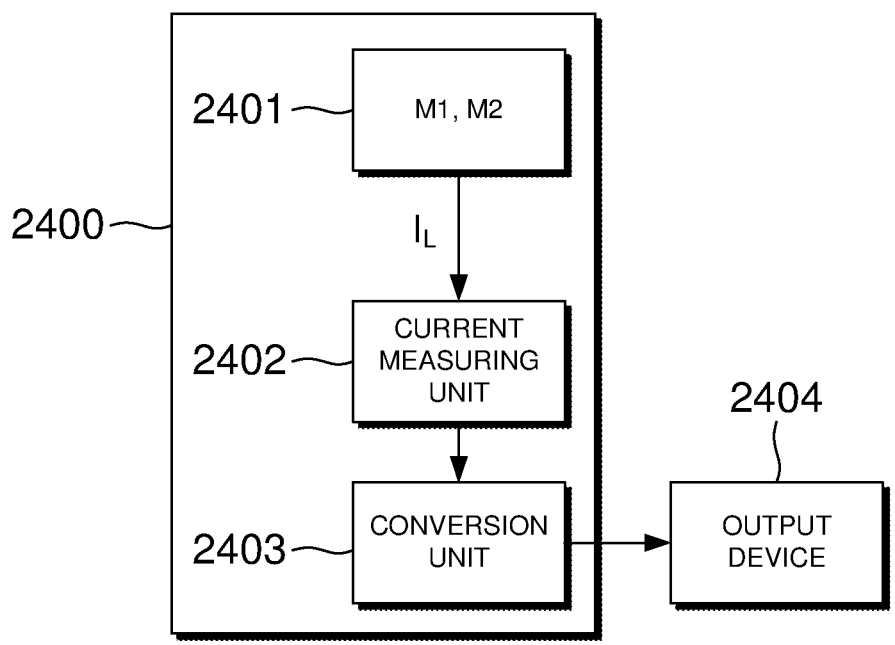
FIG. 24 illustrates a temperature sensing apparatus, according to an embodiment of the present invention.

Referring now to FIG. 24, a temperature sensing apparatus is illustrated according to an embodiment of the present invention. In this embodiment, the apparatus 2400 is configured to operate as a temperature sensor in which a magnitude of the output current at the second drain is indicative of the temperature of the first and second transistors. The apparatus 2400 comprises a current measuring unit 2403 configured to measure the magnitude of the output current, and a conversion unit 2403 configured to convert the measured current into a measurement of the temperature of the first and second transistors. In the present embodiment, the apparatus 2400 is configured to send the temperature measurement to an output device 2404. The output device 2404 may output the temperature measurement in a form that is intelligible to a human user, for example in an audio or visual format.

Whilst certain embodiments of the invention have been described herein with reference to the drawings, it will be understood that many variations and modifications will be possible without departing from the scope of the invention as defined in the accompanying claims.

The invention claimed is:

1. Apparatus comprising:
   a first thin-film transistor TFT comprising a first source, a first gate and a first drain, the first drain being configured to receive a reference current; and
   a second TFT comprising a second source, a second gate and a second drain, the first and second gates both being configured to receive the same gate voltage,
   wherein the first and second TFTs are configured such that a temperature dependence of the first TFT differs from a temperature dependence of the second TFT, such that an output current at the second TFT and the second drain is dependent on temperature.

2. The apparatus of claim 1, wherein in isolation the first and second TFTs both have a positive temperature dependence or both have a negative temperature dependence, and
   wherein the first TFT is more strongly temperature-dependent than the second TFT with the result that the overall temperature dependence of the output current is negative, such that a magnitude of the output current decreases as a temperature of the first and second TFTs increases.

3. The apparatus of claim 1, wherein in isolation the first and second TFTs both have a negative temperature dependence, and
wherein the second TFT is more strongly temperature-dependent than the first TFT with the result that the overall temperature dependence of the output current is negative, such that a magnitude of the output current decreases as a temperature of the first and second TFTs increases.

4. The apparatus of claim 1, wherein the first and second TFTs are source-gated transistors.

5. The apparatus of claim 4, wherein an area of overlap between the first source and the first gate, S1, is different to an area of overlap between the second source and the second gate, S2, such that the temperature dependence of the first TFT differs from the temperature dependence of the second TFT.

6. The apparatus of claim 5, wherein for each of the first and second TFTs a threshold source length exists beyond which increasing the source length has a negligible effect on the temperature dependence of the current flowing through the TFT, and
wherein one of S1 and S2 is at or above the threshold source length, and the other one of S1 and S2 is below the threshold source length.

7. The apparatus of claim 1, wherein the first TFT and the second TFT have different compositions such that the temperature dependence of the first TFT differs from the temperature dependence of the second TFT.

8. The apparatus of claim 1, wherein the first gate and the second gate comprise respective parts of a single gate, such that the single gate acts as a common gate for the first and second TFTs.

9. The apparatus of claim 1, wherein the apparatus is configured to operate in a temperature range between an upper temperature threshold and a lower temperature threshold, and wherein the upper and lower temperature thresholds are temperatures within a linear portion of respective temperature-current curves of the first and second TFTs.

10. The apparatus of claim 1, comprising:
a constant current source configured to supply a constant current to the first drain as the reference current.

11. The apparatus of claim 1, comprising:
a load connected to the second TFT such that a current flowing through the load is dependent on the output current at the second drain.

12. The apparatus of claim 1, wherein the apparatus is configured to operate as a temperature sensor in which a magnitude of the output current at the second drain is indicative of a temperature of the first and second TFTs.

13. The apparatus of claim 12, comprising:
a current measuring unit configured to measure the magnitude of the output current; and
a temperature determining unit configured to determine a temperature of the first and second TFTs in dependence on the current measured by the current measuring unit, optionally wherein the temperature determining unit is configured to output the determined temperature.

14. The apparatus of claim 1, comprising:
a temperature controller configured to raise or lower a temperature of the first and second TFTs, wherein the second TFT is configured to supply the output current to the temperature controller such that a magnitude of a heating or cooling effect produced by the temperature controller is dependent on a magnitude of the output current,
wherein the first and second TFTs and the temperature controller form a feedback loop such that the apparatus acts as a temperature regulating circuit configured to maintain an environment in which the first and second TFTs are located at a substantially constant temperature.

15. The apparatus of claim 14, wherein the temperature controller comprises an oscillator circuit configured such that an oscillating frequency of the oscillator circuit is dependent on the magnitude of the output current provided by the second TFT.

16. The apparatus of claim 15, wherein a Joule heating effect on the first and second TFTs due to current flowing through the oscillator circuit is dependent upon the magnitude of the output current provided by the second TFT, or
wherein the apparatus comprises a temperature control circuit configured to receive an output of the oscillator circuit as a timing signal and produce a heating or cooling effect in dependence on the oscillating frequency of the timing signal, such that the heating or cooling effect produced by the temperature control circuit is dependent on a temperature of the first and second TFTs.

17. The apparatus of claim 15, wherein the oscillator circuit is a current-starved ring oscillator circuit and the second TFT is one of a plurality of second TFTs included in the current-starved ring oscillator circuit, each one of the plurality of second TFTs comprising a respective second gate configured to receive the same gate voltage as the first gate.

18. A wearable electronic device comprising the apparatus according to claim 1, wherein the apparatus is configured to regulate a temperature of at least part of the wearable electronic device.

19. A method of designing an apparatus according to claim 1, the method comprising:
determining a target temperature dependence of the output current at the second TFT;
determining a temperature dependence of the first TFT and a temperature dependence of the second TFT required to provide an output current with the target temperature dependence; and
determining a property of the first TFT required to provide the determined temperature dependence of the first TFT, and determining a property of the second TFT required to provide the determined temperature dependence of the second TFT.

20. The method of claim 19, further comprising fabricating the designed apparatus.

* * * * *